United States Patent
Roemer

[11] Patent Number: 6,041,538
[45] Date of Patent: Mar. 28, 2000

[54] FISHING SPINNER BAIT LURE

[76] Inventor: Benjamin C. Roemer, Box 1542, Overton, Nev. 89040

[21] Appl. No.: 09/030,457

[22] Filed: Feb. 25, 1998

[51] Int. Cl.[7] ............................ A01K 85/00; A01K 85/10
[52] U.S. Cl. ....................... 43/42.06; 43/42.19; 43/42.09; 43/42.4; 43/42.38
[58] Field of Search ................................ 43/42.06, 42.09, 43/42.19, 42.2, 42.36, 42.49, 42.14, 42.4, 42.13, 43.2, 43.1, 43.4, 44.2, 44.4, 44.6, 44.8, 42.38, 44.81

[56] References Cited

U.S. PATENT DOCUMENTS

| 2,848,836 | 8/1958 | Dodd | 43/44.6 |
| 3,893,255 | 7/1975 | Hicks | 43/41 |
| 4,848,023 | 7/1989 | Ryder | 43/44.2 |
| 5,226,268 | 7/1993 | Sisson, Jr. | 43/42.13 |
| 5,611,168 | 3/1997 | Schultz | 43/44.6 |

FOREIGN PATENT DOCUMENTS

| 893872 | 2/1944 | France | 43/42.38 |

Primary Examiner—Jack W. Lavinder
Attorney, Agent, or Firm—Paul R. Puerner

[57] ABSTRACT

A fishing spinner bait lure having a wire frame member of a generally V-shape and having an upper and a lower leg and an eye at the base of the V for tying a fishing line to the wire frame member. A spinner means is rotatably mounted on the upper leg of the frame member and a weight and hook are mounted on the lower leg of the frame member. A shield member of generally triangular shape is slidably mounted on the forward end of the frame member. The shield member is made of a resilient pliable material and has a small opening in its forward end and a relatively large opening at its rear end. The small opening is adapted to accommodate a fishing line threaded therethrough to facilitate tying the fishing line to the wire frame member. The shield member has a pair of projections on the inside surface thereof to frictionally engage the legs of the frame member to thereby retain the shield member on the wire frame member. An absorption fish attraction scent member may be mounted inside the shield member. The scent member is adapted to produce a trail of scent as the lure is retrieved.

18 Claims, 3 Drawing Sheets

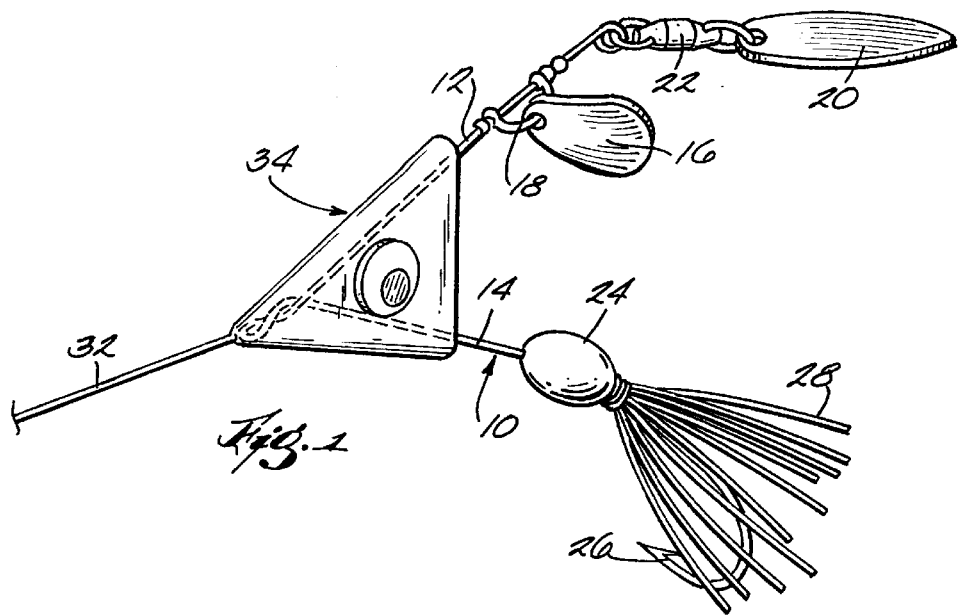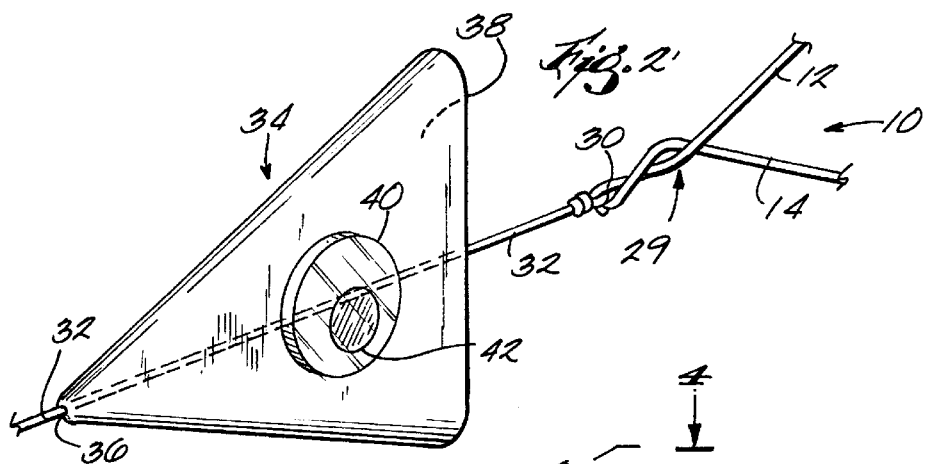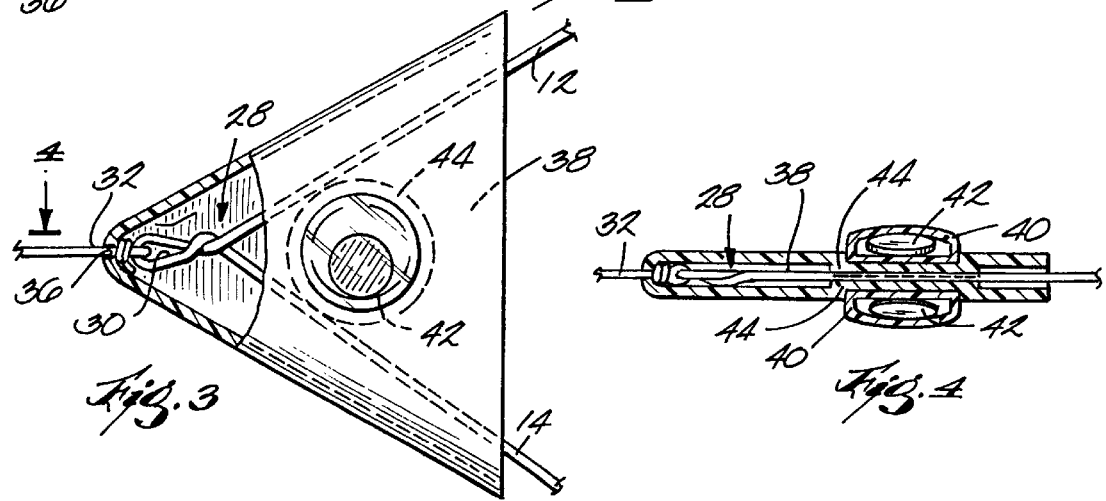

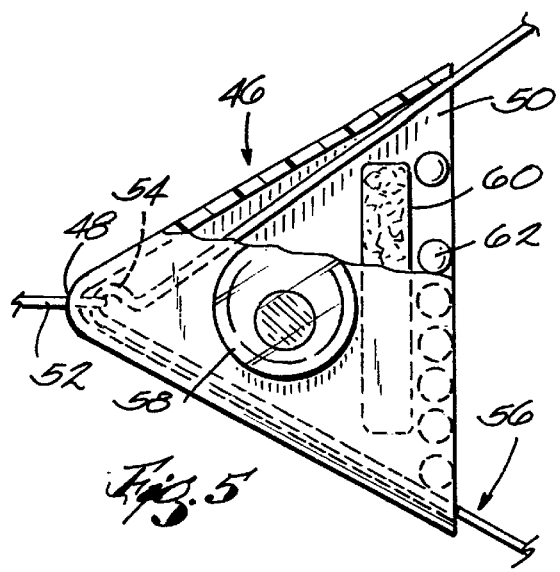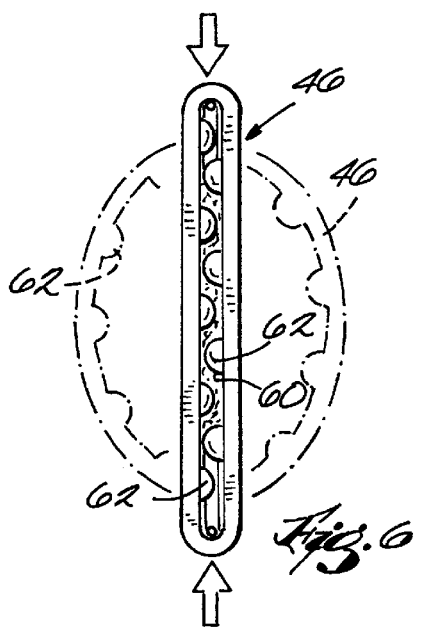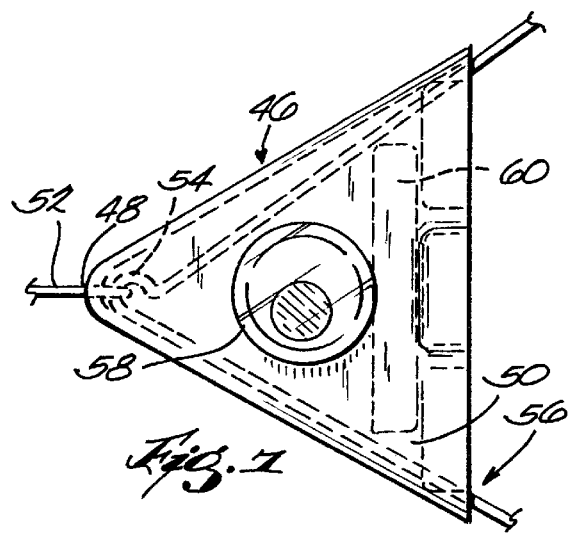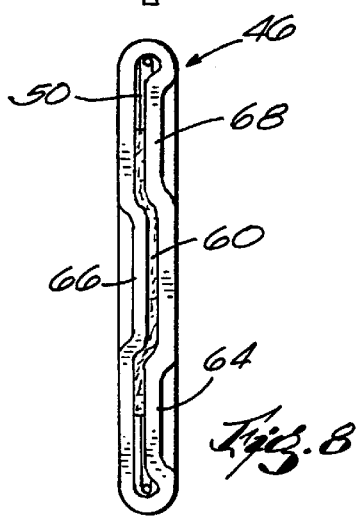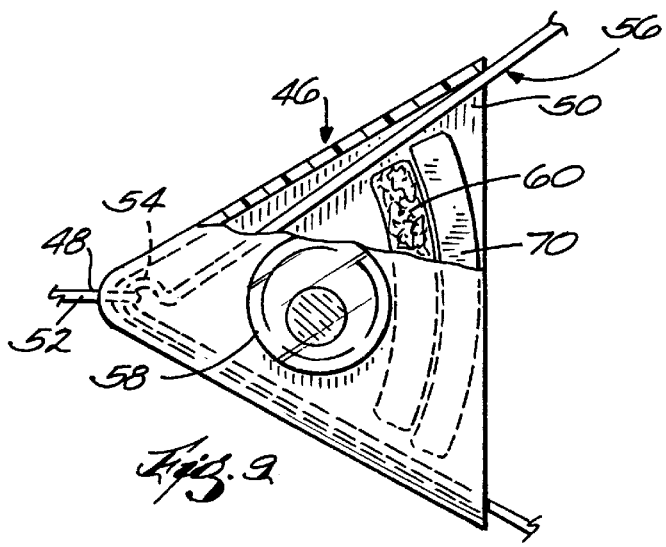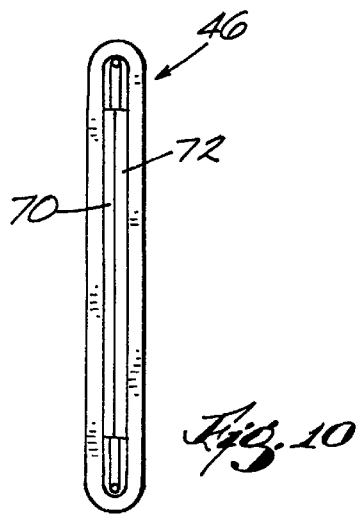

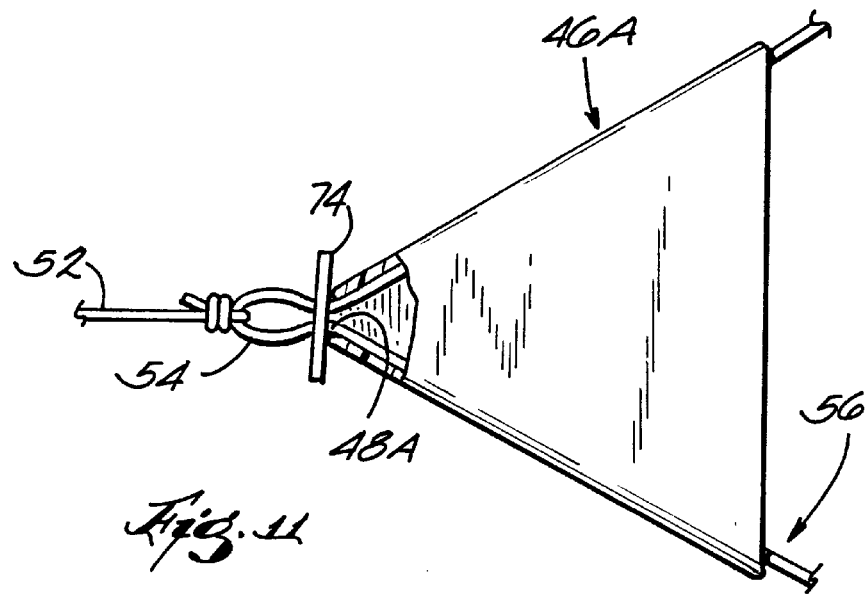
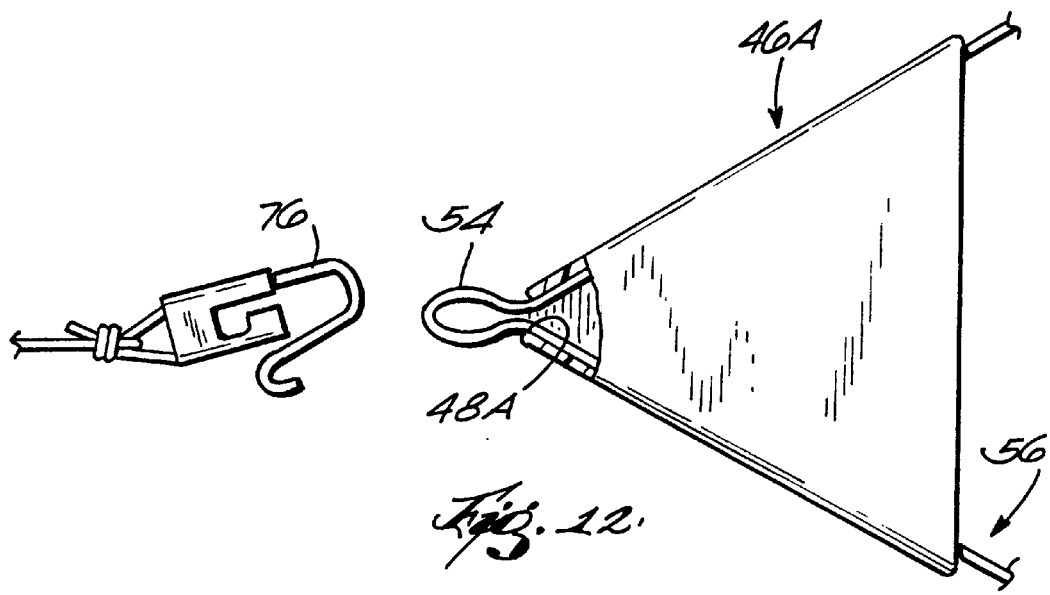

FISHING SPINNER BAIT LURE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO MICROFICHE APPENDIX

Not Applicable.

BACKGROUND OF THE INVENTION

The prior U.S. patents known to the inventor showing fishing lures in the same general category of the present invention are as follows:

U.S. Pat. No. 3,855,722
U.S. Pat. No. 3,878,636
U.S. Pat. No. 4,625,448
U.S. Pat. No. 4,765,085
U.S. Pat. No. 5,058,309
U.S. Pat. No. 5,201,784

The fishing lure of the present invention embodies certain characteristics which are novel based on the inventor's knowledge of the prior art.

BRIEF SUMMARY OF THE INVENTION

A fishing spinner bait lure having a wire frame member with an upper and lower leg. A spinner means is rotatably mounted on the upper leg and a weight and hook are mounted on the lower leg. A shield member of generally triangular shape is slidably mounted on the forward end of the wire member and is retained thereby by a pair of projections on the inside surface of the shield member. An absorption fish attraction scent member may be mounted inside the shield member to produce a trail of scent as the lure is retrieved.

BRIEF DESCRIPTION OF THE SEVERAL VIEWS OF THE INVENTION

FIG. 1 is a side view of the spinner bait fishing lure of the present invention;

FIG. 2 is a fragmentary side view of the spinner bait fishing lure shown in FIG. 1 with the shield member disassembled from the wire frame member of the spinner bait;

FIG. 3 is a view similar to FIG. 2 but with the shield member in assembled position on the wire frame member and with a portion of the shield member broken away;

FIG. 4 is a sectional view taken along line 4—4 of FIG. 3;

FIG. 5 is a fragmentary side view (with parts broken away) of a spinner bait shield member and wire frame member specially designed to removably house an absorption scent member;

FIG. 6 is an end view of FIG. 5;

FIG. 7 is a view similar to FIG. 5 showing a second embodiment of the mounting arrangement for a removably mounted absorption scent member;

FIG. 8 is an end view of FIG. 7;

FIG. 9 is a view similar to FIG. 5 showing a third embodiment of the mounting arrangement for the removably mounted absorption scent member;

FIG. 10 is an end view of FIG. 9; and

FIGS. 11 and 12 are fragmentary side views of a spinner bait fishing lure having a modified form of the shield member.

DETAILED DESCRIPTION OF THE INVENTION

Referring first to FIGS. 1, 2, 3 and 4, the fishing spinner bait lure of the present invention is comprised of a wire frame member 10 of a generally V-shape having an upper leg 12 and a lower leg 14.

A forward spinner 16 is rotatably mounted on leg 12 by a half ring member 18 and a rear spinner 20 is rotatably mounted on the end of upper leg 12 by means of a swivel 22.

A weight 24, hook 26 and a hook skirt 28 are mounted on the end of lower leg 14 of wire frame 10.

As best shown in FIG. 2, the forward end of wire frame 10 is twisted as at 29 to provide an eye 30 for tying a fishing line 32 to the frame.

A shield member (fish head) 34 of generally triangular shape is slidably mounted on wire frame 10. In the preferred embodiment, shield member 34 is made of a resilient/pliable plastic material. Shield member 34 is of a generally envelope configuration having a small opening 36 in its forward end and is completely open at its rear end as indicated by reference numeral 38.

Shield member 34 may be provided with a pair of eye sockets 40, 40 in which artificial eye members 42, 42 are mounted. As shown in FIG. 4, a pair of projections 44, 44 are formed on or adhered to the inside surface of shield member 34. As best shown in FIG. 3, projections 44, 44 function to frictionally engage the legs 12, 14 of wire frame 10 to thereby retain the shield on the frame when the lure is in use. To attach the spinner bait lure to a fish line 32, the shield member 32 is slidably disassembled from frame 10 from the position shown in FIG. 1. Fish line 32 is then threaded through shield opening 36 and tied to the eye 30 of frame 10 as shown in FIG. 2.

Shield member 34 is then slidably returned to its fishing position as shown in FIGS. 1 and 3. In such position, shield 34 will be retained on frame 10 by the frictional interaction between shield projections 44, 44 and the forward portions of legs 12, 14 of frame 10.

Fish head shield members 34 of various colors can be used interchangeably to attract different species of fish. The use of a fish head shield member 34 mounted on the spinner bait lure adds attraction to the lure to thereby improve its effectiveness. The shield member 34 further serves to increase the weed-proof characteristics of the lure. Finally, the shield member 34 keeps the fishing line 32 from fouling on the wire frame 10.

FIGS. 5–10 show three embodiments of an important additional feature of the present invention.

Referring first to FIGS. 5, 6, shield member 46 is of a construction similar to shield member 32 shown in FIGS. 1–4. Member 46 is of a generally triangular shape having a small front opening 4B and an open end portion 50. A fishing line 52 extends through forward opening 48 for tying to U-shaped forward end 54 of a wire frame member 56. Shield member 46 is provided with a pair of eye sockets 58, 58.

The important improvement of this embodiment is the provision of an absorption scent strip 60 mounted inside open end 50 of shield member 46. Scent strip 60 is retained inside the shield by a plurality of oppositely facing, alternately positioned dimples 62 formed on the inside surface of shield 46 at its open end 50 as clearly shown in FIG. 6.

In use, shield member 46 is squeezed as shown by arrows in FIG. 6 to thereby deform the shield 46 from the full line position to the dotted line position shown in FIG. 6. With the end 50 of the shield 46 in open position as shown in dotted lines in FIG. 6, a strip of absorbent material is inserted into the shield to the position shown in FIG. 5. Strip 60 may be made of cotton or other suitable absorptive material.

A suitable liquid scent formulated to attract fish is applied to the strip 60. The scent can be applied to the strip with the shield in either its open or closed position. The scent can also be applied before the strip is inserted into the shield.

Once the strip has been installed as shown in FIG. 5, it will be retained inside the shield by the plurality of side-by-side oppositely projecting dimples 62 as best shown in FIG. 6. In use, as the spinner bait lure is retrieved, a small amount of water will flow into the shield through small opening 48 through which the fish line 52 extends. This flow of water will flow past scent strip 60 into the water behind the shield. Such water flow will pick up some scent from the scent-impregnated strip 60 to thereby produce a trail of scent as the lure is retrieved. This trail of scent serves to attract fish and thereby entices fish to strike the lure.

Instructions to assemble a spinner bait with shield and scent pads:

STEPS

1. Thread the line 52 through the shield 46 starting at the small opening 48 and extend through the wide opening 50 at the rear;
2. Slip shield up the line and tie line to spinner bait loop 54;
3. Slide shield back over spinner bait loop as far as it will go;
4. Squeeze the shield to open the rear opening so you can slip a scent strip 60 behind the projections 62 on the inside of shield. These projections keep the strip in place;
5. Apply scent to the strip—(saturate it);
6. Proceed to cast.

The embodiment of FIGS. 7 an 8 is similar to the embodiment of FIGS. 5 and 6 and identical parts of the two embodiments are indicated with identical reference numerals. In the FIGS. 7–8 embodiment, the scent strip 60 is retained in the FIG. 7 position by alternately oppositely spaced indentations 64, 66, 68 formed along the open end 50 of shield 46.

In use, the lure of the FIGS. 7–8 embodiment functions like the lure of the FIGS. 5–6 embodiment.

The embodiment of FIGS. 9 and 10 is similar to the embodiment of FIGS. 5 and 6 and identical parts of the two embodiments are indicated with identical reference numerals. In the FIGS. 9–10 embodiment, the scent strip is retained in the FIG. 9 position by oppositely facing projections 70, 72 formed on the inside of shield 46 at the open end of the shield. In use, the lure of the FIGS. 9–10 embodiment functions like the lure of the FIGS. 5–6 embodiment.

FIGS. 11 and 12 show a spinning bait lure having a modified shield member 46A.

Shield member 46A has an enlarged forward opening 48A of sufficient size to allow the forward end 54 of the frame member 56 to extend through the opening 48A.

In the FIG. 11 embodiment, the shield member 46A is prevented from moving up past the end 54 by a slotted washer member 74 fitted over the end 54 of wire frame member 56.

In the FIG. 12 embodiment, the shield member 46A is prevented from moving up past the end 54 of wire member 56 by a snap fitting 76 of conventional design. When the snap fitting 76 is attached to the end 54, it will prevent the member 46A from moving up past end 54 of the frame member 56.

It will be appreciated that with the use of the modified form of the shield member shown in FIGS. 11 and 12, retaining projections 44, 44 as shown in FIGS. 3 and 4 will not be needed.

While the invention herein has been shown and described in what is presently conceived to be the most practical preferred embodiment, it will be obvious to one of ordinary skill in the art that many modifications may be made thereof within the scope of the invention, which scope is not to be limited except by the appended claims.

I claim:

1. A fishing spinner bait lure comprising:
   (a) a wire frame member of a generally V-shape having a forward end, an upper leg and a lower leg and an eye at the vertex of the V for tying a fishing line to the wire frame member;
   (b) spinner means rotatably mounted on said upper leg of said wire frame member;
   (c) a weight member and hook mounted on said lower leg of said wire frame member; and
   (d) a shield member of generally triangular shape having an inner and outer surface, a forward and rear end and being slidably mounted on the forward end of said wire frame member, said shield member made of a resilient/pliable material and having a small opening in its forward end and a relatively large opening at its rear end, said small opening adapted to accommodate a fishing line threaded therethrough to facilitate tying the fishing line to said wire frame member, said shield member further characterized as having a pair of projections on the inner surface of said shield member, said projections functioning to frictionally engage the legs of said frame member to thereby retain the shield member on said wire frame member.

2. A fishing spinner bait lure according to claim 1 in which said shield member has a pair of artificial eye members mounted on opposite sides thereof.

3. A fishing spinner bait lure according to claim 1 wherein said fish head member can be interchanged to provide shield members of various colors.

4. A fishing spinner bait lure according to claim 1 in which there is an absorption fish attraction scent member mounted inside said shield member and in which said shield member has a retainer means on said shield member, said retainer means adapted to secure and retain said scent member inside said shield means.

5. A fishing spinner bait lure according to claim 4 in which said small opening in the forward end of said shield member is of sufficient size to allow a flow of water therethrough when the lure is being retrieved.

6. A fishing spinner bait lure according to claim 4 in which said scent member retaining means is comprised of a plurality of opposed side-by-side dimples projecting from the inner surface of said shield member.

7. A fishing spinner bait lure according to claim 4 in which said scent member retaining means is comprise of a plurality of opposed alternately spaced indentations formed on the inner surface of said shield member.

8. A fishing spinner bait lure according to claim 4 in which said scent member retaining means is comprised of a pair of oppositely faced projections formed on the inner surface of said shield member.

9. A fishing spinner bait lure comprising:
(a) a wire frame member of a generally V-shape having an upper leg and a lower leg and an eye at the vertex of the V for tying a fishing line to the wire frame member;
(b) spinner means rotatably mounted on said upper leg of said wire frame member;
(c) a weight member and hook mounted on said lower leg of said wire frame member;
(d) a shield member of generally triangular shape having an inner and outer surface, a forward and rear end and being slidably mounted on the forward end of said wire frame member, said shield member made of a resilient/pliable material and having a small opening in its forward end and a relatively large opening at its rear end, said small opening adapted to accommodate a fishing line threaded therethrough to facilitate tying the fishing line to said wire frame member; and
(e) an absorption fish attraction scent member mounted inside said shield member, said scent member retained therein by a retaining means on the inner surface of said shield member, said scent member adapted to produce a trail of scent as the lure is retrieved.

10. A fishing spinner bait lure according to claim 9 in which said small opening in the forward end of said shield member is of sufficient size to allow a flow of water therethrough when the lure is being retrieved.

11. A fishing spinner bait lure according to claim 9 in which said scent member retaining means is comprised of a plurality of opposed side-by-side dimples projecting from the inner surface of said shield member.

12. A fishing spinner bait lure according to claim 9 in which said scent member retaining refrains is comprised of a plurality of opposed alternately spaced indentations formed on the inner surface of said shield member.

13. A fishing spinner bait lure according to claim 9 in which said scent member retaining means is comprised of a pair of oppositely faced projections formed on the inner surface of said shield member.

14. A fishing spinner bait lure according to claim 9 in which said shield member has a pair of artificial eye members mounted on opposite sides thereof.

15. A fishing spinner bait lure according to claim 9 wherein said shield member can be interchanged to provide shield members of various colors.

16. A fishing spinner bait lure comprising:
(a) a wire frame member of a generally V-shape having an upper leg and a lower leg and an eye at the vertex of the V for tying a fishing line to the wire frame member;
(b) spinner means rotatably mounted on said upper leg of said wire frame member;
(c) a weight member and hook mounted on said lower leg of said wire frame member;
(d) a shield member of generally triangular shape having an inner and outer surface, a forward and rear end and being slidably mounted on the forward end of said wire frame member, said shield member made of a resilient/pliable material and having an opening in its forward end and a relatively large opening in its rear end, said opening in the forward end being of sufficient size to allow the eye at the vertex of the V-shaped wire frame to extend through the forward opening;
(e) a slotted washer fitted over the eye of the frame to prevent the shield member from moving up past the eye of the frame; and
(f) an absorption fish attraction scent member mounted inside said shield member, said scent member adapted to produce a trail of scent as a lure is retrieved.

17. A fishing spinner bait lure comprising:
(a) a wire frame member of a generally V-shape having an upper leg and a lower leg and an eye at the vertex of the V for tying a fishing line to the wire frame member;
(b) spinner means rotatably mounted on said upper leg of said wire frame member;
(c) a weight member and hook mounted on said lower leg of said wire frame member;
(d) a shield member of generally triangular shape having an inner and outer surface, a forward and rear end and being slidably mounted on the forward end of said wire frame member, said shield member made of a resilient/pliable material and having an opening in its forward end and a relatively large opening in its rear end, said opening in the forward end being of sufficient size to allow the eye at the vertex of the V-shaped wire frame to extend through the forward opening;
(e) a snap member attached to the eye of the frame member to prevent the shield member from moving up past the eye of the frame member;
(f) an absorption fish attraction scent member mounted inside said shield member, said scent member adapted to produce a trail of scent as a lure is retrieved.

18. A fishing spinner bait lure comprising:
(a) a wire frame member of a generally V-shape having an upper leg and a lower leg and an eye at the vertex of the V for tying a fishing line to the wire frame member;
(b) spinner means rotatably mounted on said upper leg of said wire frame member;
(c) a weight member and hook mounted on said lower leg of said wire frame member;
(d) a shield member of generally triangular shape having an inner and outer surface, a forward and rear end and being slidably mounted on the forward end of said wire frame member, said shield member made of a resilient/pliable material and having a small opening in its forward end and a relatively large opening at its rear end, said small opening adapted to accommodate a fishing line threaded therethrough to facilitate tying the fishing line to said wire frame member;
(e) an absorption fish attraction scent member mounted inside said shield member, said scent member adapted to produce a trail of scent as the lure is retrieved; and
(f) said shield member having a pair of projections on the inner surface of said shield member, said projections functioning to frictionally engage the legs of said frame member to thereby retain the shield member on said wire frame member.

* * * * *